(12) United States Patent
Ku et al.

(10) Patent No.: US 9,103,355 B2
(45) Date of Patent: Aug. 11, 2015

(54) FLOW CONTROL VALVE FOR CONSTRUCTION MACHINE

(75) Inventors: Bon-Seuk Ku, Changwon-si (KR); Hea-Gyoon Joung, Busan (KR); Man-Seuk Jeon, Changwon-si (KR)

(73) Assignee: Volvo Construction Equipment AB (SE)

( * ) Notice: Subject to any disclaimer, the term of this patent is extended or adjusted under 35 U.S.C. 154(b) by 118 days.

(21) Appl. No.: 13/885,093

(22) PCT Filed: Nov. 25, 2010

(86) PCT No.: PCT/KR2010/008395
§ 371 (c)(1),
(2), (4) Date: May 13, 2013

(87) PCT Pub. No.: WO2012/070703
PCT Pub. Date: May 31, 2012

(65) Prior Publication Data
US 2013/0228245 A1   Sep. 5, 2013

(51) Int. Cl.
*F16K 11/07* (2006.01)
*F15B 13/02* (2006.01)
(Continued)

(52) U.S. Cl.
CPC ............. *F15B 13/026* (2013.01); *E02F 9/2267* (2013.01); *F15B 13/0418* (2013.01); *F15B 13/06* (2013.01); *F16K 11/0716* (2013.01)

(58) Field of Classification Search
USPC ............. 137/625.66, 625.68, 625.69; 91/446, 91/447, 448
See application file for complete search history.

(56) References Cited

U.S. PATENT DOCUMENTS 3,136,328 A * 6/1964 Hipp .................... 137/115.08
3,910,311 A * 10/1975 Wilke ....................... 137/596
(Continued)

FOREIGN PATENT DOCUMENTS

JP   49-021718      2/1974
JP   07-229503 A    8/1995
(Continued)

OTHER PUBLICATIONS

International Search Report (in Korean and English) and Written Opinion (in Korean) for PCT/KR2010/008395, mailed Aug. 26, 2011; ISA/KR.
(Continued)

*Primary Examiner* — Kevin Murphy
*Assistant Examiner* — R. K. Arundale
(74) *Attorney, Agent, or Firm* — Harness, Dickey & Pierce, P.L.C.

(57) ABSTRACT

A flow control valve for a construction machine is provided, which can constantly control a flow rate of hydraulic fluid supplied to a hydraulic actuator through a flow control spool in a spool. The flow control valve for a construction machine, having a valve body in which a supply passage communicating with a pump passage and actuator ports connected to a hydraulic actuator are formed, and a spool installed in the valve body to be shifted, includes a flow control spool shifted in the spool to variably control a cross-sectional area of a passage connected to the one actuator port if a flow rate of the hydraulic fluid that flows through the supply passage is higher than a set flow rate, a first passage formed on the spool to communicate with the supply passage and a second passage formed on the spool to communication with the one actuator port and having a cross-sectional area that is varied depending on the shifting of the flow control spool.

4 Claims, 3 Drawing Sheets

(51) Int. Cl.
*E02F 9/22* (2006.01)
*F15B 13/04* (2006.01)
*F15B 13/06* (2006.01)

(56) References Cited

U.S. PATENT DOCUMENTS

| | | | | |
|---|---|---|---|---|
| 3,985,153 | A | * 10/1976 | Thomas | 137/596 |
| 5,174,329 | A | * 12/1992 | Yoshino et al. | 137/501 |
| 5,433,076 | A | 7/1995 | Sugiyama et al. | |
| 6,915,729 | B2 | 7/2005 | Kim | |
| 2004/0237772 | A1 | 12/2004 | Kim | |
| 2013/0098021 | A1 | 4/2013 | Shin et al. | |
| 2013/0103270 | A1 | 4/2013 | Joung et al. | |

FOREIGN PATENT DOCUMENTS

| | | |
|---|---|---|
| JP | 10-009415 | 1/1998 |
| JP | 11-093221 | 4/1999 |
| JP | 11257303 A | 9/1999 |
| JP | 2004-353859 A | 12/2004 |
| JP | 2007-032782 A | 2/2007 |
| KR | 10-1994-07003973 A | 12/1994 |
| KR | 10-2006-0108850 A | 10/2006 |

OTHER PUBLICATIONS

International Preliminary Report on Patentability (Chapter II) (in Korean) for PCT/KR2010/008395, dated Feb. 27, 2013; IPEA/KR.

* cited by examiner

FLOW CONTROL VALVE FOR CONSTRUCTION MACHINE

TECHNICAL FIELD

The present invention relates to a flow control valve for a construction machine which can control a flow rate of hydraulic fluid supplied to a hydraulic actuator, such as a hydraulic cylinder, that is mounted on an excavator or the like. More particularly, the present invention relates to a flow control valve for a construction machine which can control a flow rate of hydraulic fluid that is supplied from a hydraulic pump to a hydraulic actuator in a spool of a control valve.

BACKGROUND ART

A flow control valve for a construction machine in the prior art, as illustrated in FIG. 1, includes a valve body 5 in which a pump passage 1 through which hydraulic fluid from a hydraulic pump is supplied, a supply passage 2 connected in parallel to the pump passage 1, and actuator ports 3 and 4 connected to hydraulic actuators, such as hydraulic cylinders, are formed; and a spool 7 installed in the valve body 5 and shifted in response to application of pilot signal pressure thereto to make the supply passage 2 and the actuator port 3 or 4 communicate with each other so as to supply the hydraulic fluid from the hydraulic pump to the hydraulic actuator through the one actuator port 3 and simultaneously return the hydraulic fluid that is discharged from the hydraulic actuator to a hydraulic fluid tank through the other actuator port 4 and a tank passage 6.

In the drawing, the unexplained reference numeral "10" denotes a relief valve that returns a part of the hydraulic fluid to the hydraulic fluid tank through the tank passage 6 if pressure of the hydraulic fluid that is supplied to the hydraulic actuator exceeds a set value.

According to the flow control valve in the prior art as configured above, if the pilot signal pressure is applied to the right signal pressure port of the valve body 5 to shift the spool 7 in the left direction in the drawing, the hydraulic fluid from the hydraulic pump passes through the pump passage 1, the supply passage 2, a notch 8 of the spool 7, and the actuator port 3 in order, and then is supplied to the hydraulic actuator to drive the hydraulic actuator.

At the same time, the hydraulic fluid that is discharged from the hydraulic actuator passes through the actuator port 4, a notch 9 of the spool 7, and the tank passage 6 in order, and then is returned to the hydraulic fluid tank.

However, according to the flow control valve in the prior art as described above, in the case of controlling the flow rate so that the hydraulic fluid from the hydraulic pump passes through the pump passage 1, the supply passage 2, and the actuator port 3 in order and then is supplied to the hydraulic actuator through the shifting of the spool 7, the flow rate of the hydraulic fluid, which is supplied to the hydraulic actuator through the notch 8 of the spool 7, may differ depending on the pressure generated in the hydraulic pump and the hydraulic actuator and the change of the supplied flow rate of the hydraulic pump.

DISCLOSURE

Technical Problem

Therefore, the present invention has been made to solve the above-mentioned problems occurring in the prior art, and one embodiment of the present invention is related to a flow control valve for a construction machine, which can constantly control the flow rate of hydraulic fluid that is supplied from a pump passage to a hydraulic actuator through shifting of a spool regardless of the pressure generated in a hydraulic pump and the hydraulic actuator and the change of a supplied flow rate of the hydraulic pump.

Technical Solution

In accordance with a first aspect of the present invention, there is provided a flow control valve for a construction machine, including a valve body in which a supply passage communicating with a pump passage through which hydraulic fluid from a hydraulic pump is supplied and actuator ports connected to a hydraulic actuator are formed, and a spool installed in the valve body and shifted to make the supply passage and the actuator port communicate with each other so as to supply the hydraulic fluid from the hydraulic pump to the hydraulic actuator through the one actuator port and to return the hydraulic fluid discharged from the hydraulic actuator to a tank passage through the other actuator port, which includes a flow control spool shifted in the spool to variably control a cross-sectional area of a passage that is connected to the one actuator port if a flow rate of the hydraulic fluid that flows through the supply passage is higher than a set flow rate; a first passage formed on the spool to communicate with the supply passage; a second passage formed on the spool to communication with the one actuator port and having a cross-sectional area that is varied depending on the shifting of the flow control spool; a first flow control passage formed on the flow control spool to communicate with the first passage; a second flow control passage formed on the flow control spool to communicate with the second passage; a third passage formed on the flow control spool to communicate with the first and second flow control passages; a first signal pressure passage formed on the flow control spool to make the first flow control passage and a pressure chamber communicate with each other; and a second signal pressure passage formed on the flow control spool to make the third passage and a back pressure chamber communicate with each other.

In accordance with a second aspect of the present invention, there is provided a flow control valve for a construction machine, including a valve body in which a supply passage communicating with a pump passage through which hydraulic fluid from a hydraulic pump is supplied and actuator ports connected to a hydraulic actuator are formed, and a spool installed in the valve body and shifted to make the supply passage and the actuator port communicate with each other so as to supply the hydraulic fluid from the hydraulic pump to the hydraulic actuator through the one actuator port and to return the hydraulic fluid discharged from the hydraulic actuator to a tank passage through the other actuator port, which includes a flow control spool shifted in the spool to variably control a cross-sectional area of a passage that is connected to the one actuator port if a flow rate of the hydraulic fluid that flows through the supply passage is higher than a set flow rate; a first passage formed on the spool to communicate with the supply passage; a second passage formed on the spool to communication with the one actuator port and having a cross-sectional area that is varied depending on the shifting of the flow control spool; a first flow control passage formed on the flow control spool to communicate with the first passage; a second flow control passage formed on the flow control spool to communicate with the second passage; a third passage formed on the flow control spool to communicate with the first and second flow control passages; a second signal pressure passage formed on the flow control spool to make the third passage and a back pressure chamber communicate with each other; and a third signal pressure passage formed on the spool to make the supply passage and a pressure chamber communicate with each other so that signal pressure can be supplied to the pressure chamber to shift the flow control spool.

In accordance with a third aspect of the present invention, there is provided a flow control valve for a construction machine, including a valve body in which a supply passage communicating with a pump passage through which hydraulic fluid from a hydraulic pump is supplied and actuator ports connected to a hydraulic actuator are formed, and a spool installed in the valve body and shifted to make the supply passage and the actuator port communicate with each other so as to supply the hydraulic fluid from the hydraulic pump to the hydraulic actuator through the one actuator port and to return the hydraulic fluid discharged from the hydraulic actuator to a tank passage through the other actuator port, which includes a flow control spool shifted in the spool to fix a cross-sectional area of a passage that is connected to the one actuator port to a set value if pressure of the hydraulic fluid that flows through the supply passage is higher than a set pressure; a first passage formed on the spool to communicate with the supply passage; a second passage formed on the spool to communication with the one actuator port and having a cross-sectional area that is varied depending on the shifting of the flow control spool; a first flow control passage formed on the flow control spool to communicate with the first passage; a second flow control passage formed on the flow control spool to communicate with the second passage; and a third passage formed on the flow control spool to communicate with the first and second flow control passages.

In accordance with a fourth aspect of the present invention, there is provided a flow control valve for a construction machine, including a valve body in which a supply passage communicating with a pump passage through which hydraulic fluid from a hydraulic pump is supplied and actuator ports connected to a hydraulic actuator are formed, and a spool installed in the valve body and shifted to make the supply passage and the actuator port communicate with each other so as to supply the hydraulic fluid from the hydraulic pump to the hydraulic actuator through the one actuator port and to return the hydraulic fluid discharged from the hydraulic actuator to a tank passage through the other actuator port, which includes a flow control spool shifted in the spool to fix a cross-sectional area of a passage that is connected to the one actuator port to a set value if pressure of the hydraulic fluid that flows through the supply passage is higher than a set pressure; a first passage formed on the spool to communicate with the supply passage; a second passage formed on the spool to communication with the one actuator port and having a cross-sectional area that is varied depending on the shifting of the flow control spool; a first flow control passage formed on the flow control spool to communicate with the first passage; a second flow control passage formed on the flow control spool to communicate with the second passage; a third passage formed on the flow control spool to communicate with the first and second flow control passages; and a signal pressure passage formed on the spool to make the supply passage and a pressure chamber communicate with each other so that signal pressure can be supplied to the pressure chamber to shift the flow control spool.

In accordance with the aspects of the present invention, the flow control valve for a construction machine may further include a hydraulic fluid flow passage formed on the spool to supply the hydraulic fluid that flows through the supply passage to the one actuator port if the pressure of the hydraulic fluid that flows into the third passage is increased and the second passage is clogged due to the shifting of the flow control spool.

Advantageous Effects

As described above, according to the hydraulic control valve according to the aspect of the present invention, the following advantages can be obtained.

Since the flow rate of the hydraulic fluid supplied to the actuator ports through the pump passage and the spool is constantly controlled through the shifting of the spool, a separate space for installing the flow control valve is unnecessary, and thus the manufacturing cost of the control valve can be reduced.

Further, since the flow rate of the hydraulic fluid supplied from the pump passage to the hydraulic actuator is controlled through the shifting of the spool, the flow rate can be constantly controlled regardless of the pressure generated in the hydraulic pump and the hydraulic actuator and the change of the supplied flow rate of the hydraulic pump, and thus the equipment has reliability.

BRIEF DESCRIPTION OF THE DRAWINGS

The above objects, other features and advantages of the present invention will become more apparent by describing the preferred embodiments thereof with reference to the accompanying drawings, in which.

DESCRIPTION OF REFERENCE NUMERALS IN THE DRAWING

Figure 1:
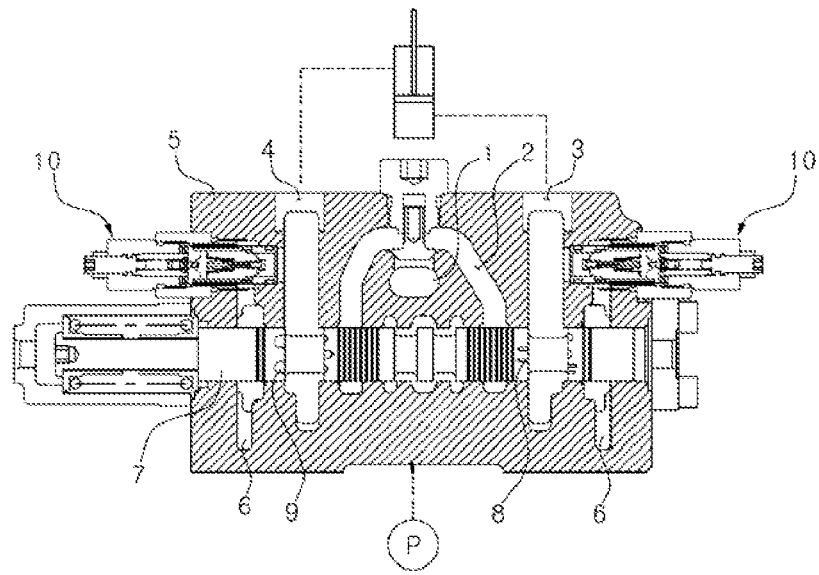
FIG. 1 is a schematic cross-section view of a flow control valve for a construction machine in the prior art.

1: pump passage
2: supply passage
3, 4: actuator port
5: valve body
6: tank passage
7: spool
11: flow control spool
12: first passage
13: second passage
14: first flow control passage
15: second flow control passage
16: third passage
17: pressure chamber
18: first signal pressure passage 19: back pressure chamber
20: second signal pressure passage
21: valve spring
23: third signal pressure passage
26: hydraulic fluid flow passage
27: signal pressure passage

BEST MODE

Now, preferred embodiments of the present invention will be described in detail with reference to the accompanying drawings. The matters defined in the description, such as the detailed construction and elements, are nothing but specific details provided to assist those of ordinary skill in the art in a comprehensive understanding of the invention, and the present invention is not limited to the embodiments disclosed hereinafter.

Figure 2:
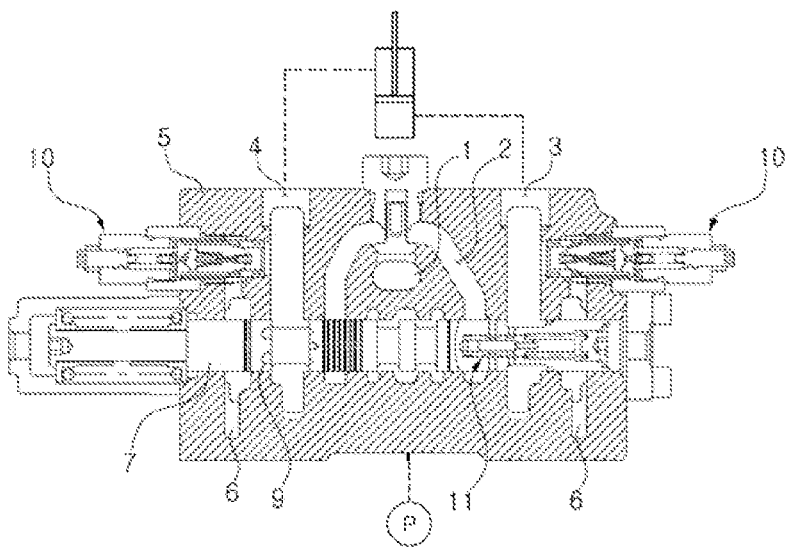
FIG. 2 is a schematic cross-sectional view of a flow control valve for a construction machine according to a first embodiment of the present invention.
Figure 3:
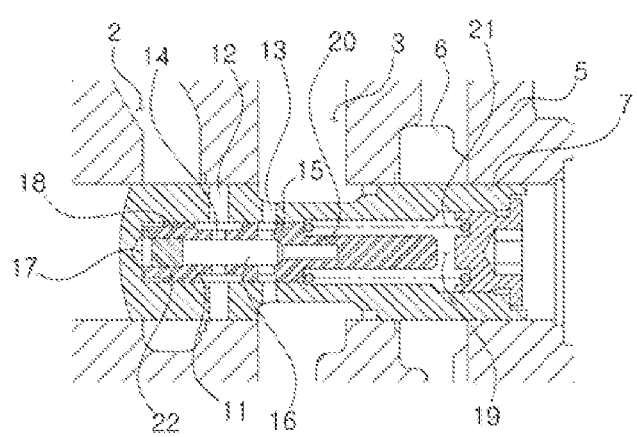
FIG. 3 is a cross-sectional view of a major portion of a flow control valve for a construction machine according to a first embodiment of the present invention.

According to a first embodiment of the present invention as illustrated in FIGS. 2 and 3, there is provided a flow control valve for a construction machine, including a valve body 5 in which a pump passage 1 through which hydraulic fluid from a hydraulic pump (not illustrated) is supplied, a supply passage 2 connected in parallel to the pump passage 1, and actuator ports 3 and 4 connected to a hydraulic actuator (not illustrated), such as a boom cylinder, are formed, and a spool 7 installed in the valve body 5 and shifted in response to application of pilot signal pressure thereto to make the supply passage 2 and the actuator ports 3 and 4 communicate with each other so as to supply the hydraulic fluid from the hydraulic pump to the hydraulic actuator through the one actuator port 3 and to return the hydraulic fluid discharged from the hydraulic actuator to a tank passage 6 through the other actuator port 4, which includes a flow control spool 11 elastically installed in the spool 7 by a valve spring 21 and shifted in the spool 7 to variably control a cross-sectional area of a passage that is connected to the one actuator port 3 if a flow rate of the hydraulic fluid that flows through the supply passage 2 is higher than a set flow rate; a first passage 12 formed on the spool 7 to communicate with the supply passage 2; a second passage 13 formed on the spool 7 to communication with the one actuator port 3 and having a cross-sectional area that is varied depending on the shifting of the flow control spool 11; a first flow control passage 14 formed on the flow control spool 11 to communicate with the first passage 12; a second flow control passage 15 formed on the flow control spool 11 to communicate with the second passage 13; a third passage 16 formed on the flow control spool 11 to communicate with the first and second flow control passages 14 and 15; a first signal pressure passage 18 (formed as a slot) formed on the flow control spool 11 to make the first flow control passage 14 and a pressure chamber 17 communicate with each other; and a second signal pressure passage 20 formed on the flow control spool 11 to make the third passage 16 and a back pressure chamber 19 communicate with each other.

In the drawing, the unexplained reference numeral "22" denotes a block that separates the pressure chamber 17 and the third passage 16 from each other.

Hereinafter, the operation of the flow control valve for a construction machine according to the first embodiment of the present invention will be described in detail with reference to the accompanying drawings.

As shown in FIGS. 2 and 3, if pilot signal pressure is applied to the right signal pressure port of the valve body 5 and the spool 7 is shifted in the left direction in the drawing, the hydraulic fluid from the hydraulic pump passes through the pump passage 1, the supply passage 2, and the one actuator port 3 in order, and then is supplied to the hydraulic actuator to drive the hydraulic actuator.

At the same time, the hydraulic fluid that is discharged from the hydraulic actuator passes through the other actuator port 4, a notch 9 of the spool 7, and the tank passage 7 in order, and then is returned to the hydraulic fluid tank.

As described above, if the spool 7 is shifted in the left direction in the drawing, the hydraulic fluid supplied to the supply passage 2 passes through the first passage 12 of the spool 7, the first flow control passage 14 of the flow control spool 11, the third passage 16 of the flow control spool 11, the second flow passage 15 of the flow control spool 11, and the second passage 13 of the spool 7 in order, and then is supplied to the one actuator port 3.

If the flow rate of the hydraulic fluid that is supplied to the third passage 16 exceeds a set flow rate, the pressure of the hydraulic fluid that is supplied to the pressure chamber 17 along the first signal pressure passage 18 formed on the flow control spool 11 is increased.

At this time, if the pressure of the pressure chamber 17 is relatively higher than the pressure that is obtained by summing the elastic force of the valve spring 21 and the pressure formed in the back pressure chamber 19, the flow control spool 11 is shifted in the right direction in the drawing. At this time, the cross-sectional area of the second passage 13 is decreased through the shifting of the flow control spool 11.

As described above, since the cross-sectional area of the second passage 13 is decreased due to the shifting of the flow control spool 11, the flow rate of the hydraulic fluid that passes through the one actuator port 3 is decreased.

Accordingly, the pressure of the third passage 16 is increased, and thus a part of the hydraulic fluid of the third passage 16 moves to the back pressure chamber 19 through the second signal pressure passage 20 formed on the flow control spool 11. At this time, since the pressure that is obtained by summing the elastic restoring force of the valve spring 21 and the pressure formed in the back pressure chamber 19 becomes relatively higher than the pressure formed in the pressure chamber 17, the flow control spool 11 moves in the left direction in the drawing.

Through this, the cross-sectional area of the second passage 13 is increased, and thus the hydraulic fluid supplied through the supply passage 2 can be supplied to the one actuator port 3 through the first and second passages 12 and 13 of the spool 7, the first and second flow control passages 14 and 15 of the flow control spool 11, and the third passage 16 at the set flow rate.

According to the flow control valve according to the first embodiment of the present invention as described above, if the hydraulic fluid, which passes through the pump passage 1 and the supply passage 2, is supplied to the one actuator port 3, the cross-sectional area of the passage connected to the one actuator port 3 is variably controlled depending on the flow rate of the hydraulic fluid that flows into the spool 7 through the flow control spool 11 provided in the spool 7. Through this, the hydraulic fluid can be supplied from the supply passage 2 to the one actuator port 3 at a constant flow rate regardless of the pressure of the hydraulic pump and the hydraulic actuator and the supplied flow rate of the hydraulic pump.

Figure 4:
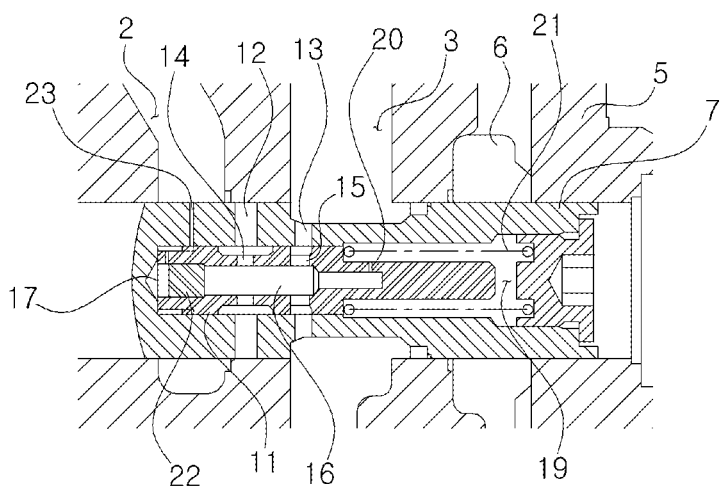
FIG. 4 is a cross-sectional view of a major portion of a flow control valve for a construction machine according to a second embodiment of the present invention.

According to a second embodiment of the present invention as illustrated in FIGS. 2 and 4, there is provided a flow control valve for a construction machine, including a valve body 5 in which a pump passage 1 through which hydraulic fluid from a hydraulic pump (not illustrated) is supplied, a supply passage 2 connected in parallel to the pump passage 1, and actuator ports 3 and 4 connected to a hydraulic actuator (not illustrated), such as a boom cylinder, are formed, and a spool 7 installed in the valve body 5 and shifted to make the supply passage 2 and the actuator ports 3 and 4 communicate with each other so as to supply the hydraulic fluid from the hydraulic pump to the hydraulic actuator through the one actuator port 3 and to return the hydraulic fluid discharged from the hydraulic actuator to a tank passage 6 through the other actuator port 4, which includes a flow control spool 11 elastically installed in the spool 7 by a valve spring 21 and shifted in the spool 7 to variably control a cross-sectional area of a passage that is connected to the one actuator port 3 if a flow rate of the hydraulic fluid that flows through the supply passage 2 is higher than a set flow rate; a first passage 12 formed on the spool 7 to communicate with the supply passage 2; a second passage 13 formed on the spool 7 to communication with the one actuator port 3 and having a cross-sectional area that is varied depending on the shifting of the flow control spool 11; a first flow control passage 14 formed on the flow control spool 11 to communicate with the first passage 12; a second flow control passage 15 formed on the flow control spool 11 to communicate with the second passage 13; a third passage 16 formed on the flow control spool 11 to communicate with the first and second flow control passages 14 and 15; a second signal pressure passage 20 formed on the flow control spool 11 to make the third passage 16 and a back pressure chamber 19 communicate with each other; and a third signal pressure passage 23 formed on the spool 7 to make the supply passage 2 and a pressure chamber 17 communicate with each other so that signal pressure can be supplied to the pressure chamber 17 to shift the flow control spool 11.

In this case, since the configuration according to this embodiment, except for the third signal pressure passage 23 formed on the spool 7 to make the supply passage 2 and the pressure chamber 17 communicate with each other so that the signal pressure for shifting the flow control spool 11 can be supplied to the pressure chamber 17, is the same as the configuration of the flow control valve according to the first embodiment of the present invention, the detailed description of the configuration and the operation thereof will be omitted, and the same reference numerals are used for the duplicate components.

Hereinafter, the operation of the flow control valve for a construction machine according to the second embodiment of the present invention will be described in detail with reference to the accompanying drawings.

As shown in FIGS. 2 and 4, if the flow rate of the hydraulic fluid that is supplied to the third passage 16 of the flow control spool 11 through the supply passage 2 through the shifting of the spool 7 exceeds the set flow rate, the hydraulic fluid of the supply passage 2 is supplied to the pressure chamber 17 through the third signal pressure passage 23 formed on the spool 7 as signal pressure, and thus the pressure of the hydraulic fluid in the pressure chamber 17 is increased.

Through this, the pressure of the pressure chamber 17 becomes relatively higher than the pressure that is obtained by summing the elastic force of the valve spring 21 and the pressure formed in the back pressure chamber 19, and thus the flow control spool 11 is shifted in the right direction in the drawing. Accordingly, the cross-sectional area of the second passage 13 is decreased by the flow control spool 11, and thus the flow rate of the hydraulic fluid that is supplied to the one actuator port 3 through the second passage 13 can be decreased.

On the other hand, since the cross-sectional area of the second passage 13 is decreased and the flow rate of the hydraulic fluid that gets out of the second flow control passage 15 is decreased, the pressure of the third passage 16 is increased. Accordingly, a part of the hydraulic fluid of the third passage 16 moves to the back pressure chamber 19 through the second signal pressure passage 20 formed on the flow control spool 11. At this time, since the pressure that is obtained by summing the elastic restoring force of the valve spring 21 and the pressure formed in the back pressure chamber 19 becomes relatively higher than the pressure formed in the pressure chamber 17, the flow control spool 11 moves in the left direction in the drawing.

Through this, the cross-sectional area of the second passage 13 is increased, and thus the hydraulic fluid supplied through the supply passage 2 can be supplied to the one actuator port 3 through the first and second passages 12 and 13 of the spool 7, the first and second flow control passages 14 and 15 of the flow control spool 11, and the third passage 16 at the set flow rate.

Figure 5:
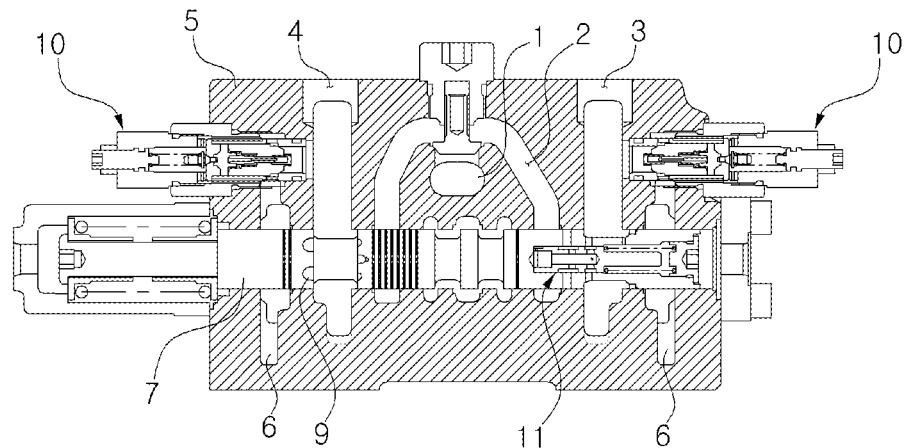
FIG. 5 is a schematic cross-sectional view of a flow control valve for a construction machine according to a third embodiment of the present invention.
Figure 6:
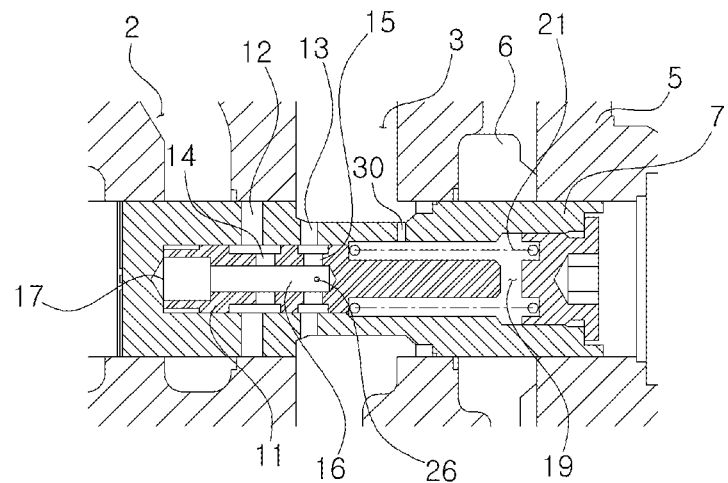
FIG. 6 is a cross-sectional view of a major portion of a flow control valve for a construction machine according to a third embodiment of the present invention.

According to a third embodiment of the present invention as illustrated in FIGS. 5 and 6, there is provided a flow control valve for a construction machine, including a valve body 5 in which a pump passage 1 through which hydraulic fluid from a hydraulic pump (not illustrated) is supplied, a supply passage 2 connected in parallel to the pump passage 1, and actuator ports 3 and 4 connected to a hydraulic actuator (not illustrated), such as a boom cylinder, are formed, and a spool 7 installed in the valve body 5 and shifted to make the supply passage 2 and the actuator ports 3 and 4 communicate with each other so as to supply the hydraulic fluid from the hydraulic pump to the hydraulic actuator through the one actuator port 3 and to return the hydraulic fluid discharged from the hydraulic actuator to a tank passage 6 through the other actuator port 4, which includes a flow control spool 11 elastically installed in the spool 7 by a valve spring 21 and shifted in the spool 7 to fix a cross-sectional area of a passage that is connected to the one actuator port 3 to a set value if pressure of the hydraulic fluid that flows through the supply passage 2 is higher than a set pressure; a first passage 12 formed on the spool 7 to communicate with the supply passage 2; a second passage 13 formed on the spool 7 to communication with the one actuator port 3 and having a cross-sectional area that is varied depending on the shifting of the flow control spool 11; a first flow control passage 14 formed on the flow control spool 11 to communicate with the first passage 12; a second flow control passage 15 formed on the flow control spool 11 to communicate with the second passage 13; and a third passage 16 formed on the flow control spool 11 to communicate with the first and second flow control passages 14 and 15.

In accordance with the third embodiment of the present invention, the flow control valve for a construction machine may further include a hydraulic fluid flow passage 26 formed on the spool 7 to supply the hydraulic fluid, which flows to the third passage 16 through the supply passage 2, to the one actuator port 3 if the pressure of the hydraulic fluid that flows into the third passage 16 is increased and the second passage 13 is clogged due to the shifting of the flow control spool 11.

Hereinafter, the operation of the flow control valve for a construction machine according to the third embodiment of the present invention will be described in detail with reference to the accompanying drawings.

As shown in FIGS. 5 and 6, if the spool 7 is shifted in the left direction in the drawing and the flow rate of the hydraulic fluid that is supplied to the third passage 16 of the flow control spool 11 through the supply passage 2 exceeds the set flow rate, the pressure of the pressure chamber 17 that communicates with the third passage 16 is increased.

At this time, if the pressure of the pressure chamber 17 is relatively higher than the pressure that is obtained by summing the elastic force of the valve spring 21 and the pressure of the back pressure chamber 19, the flow control spool 11 is shifted in the right direction in the drawing (at this time, a part of the hydraulic fluid of the back pressure chamber 19 moves to the one actuator port 3 through a through-hole 30). Accordingly, the cross-sectional area of the second passage 13 is decreased due to the shifting of the flow control spool 11, and thus the flow rate of the hydraulic fluid that flows from the supply passage 2 to the third passage 16 of the flow control spool 11 and then gets out of the second flow control path 15 is decreased.

On the other hand, if the increased pressure of the third passage 16 exceeds the set value and the flow control spool 11 is further shifted in the right direction in the drawing, the second passage 13 of the spool 7 is clogged.

Through this, the flow passage between the third passage 16 and the one actuator port 3 is intercepted, and the hydraulic fluid in the third passage 16 is supplied to the one actuator port 3 through the hydraulic fluid flow passage 26 formed on the spool 7 to communicate with the one actuator port 3 (that is, the passage that gets out of the third passage 16 to the one actuator port 3 is fixed to the cross-sectional area of the hydraulic fluid flow passage 26).

If the pressure of the hydraulic fluid in the third passage 16 is lowered below the set value, the pressure that is obtained by summing the elastic restoring force of the valve spring 21 and the pressure of the back pressure chamber 19 becomes relatively higher than the pressure of the pressure chamber 17, and thus the flow control spool 11 is shifted in the left direction in the drawing.

Through this, the flow passages between the third passage 16 of the flow control spool 11, the second flow control passage 15, and the one actuator port 3 communicate with each other, and thus the hydraulic fluid that flows into the third passage 16 is supplied to the one actuator port 3 through the second flow control path 15 at the set flow rate.

According to the flow control valve according to the third embodiment of the present invention as described above, if the pressure of the hydraulic fluid, which flows to the third passage 16 through the supply passage 2, exceeds the set value, the second passage 13 is intercepted due to the shifting of the flow control spool 11 provided in the spool 7. Through this, the hydraulic fluid of the third passage 16 is supplied to the one actuator port 3 through the hydraulic fluid flow passage 26 having a constant cross-sectional area.

Through this, the hydraulic fluid can be supplied from the supply passage 2 to the one actuator port 3 at a constant flow rate regardless of the pressure of the hydraulic pump and the hydraulic actuator and the supplied flow rate of the hydraulic pump.

Figure 7:
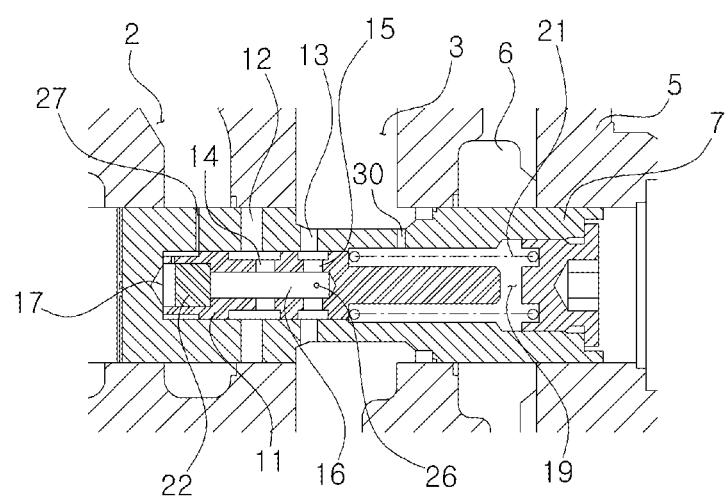
FIG. 7 is a cross-sectional view of a major portion of a flow control valve for a construction machine according to a fourth embodiment of the present invention.

According to a fourth embodiment of the present invention as illustrated in FIGS. 5 and 7, there is provided a flow control valve for a construction machine, including a valve body 5 in which a pump passage 1 through which hydraulic fluid from a hydraulic pump (not illustrated) is supplied, a supply passage 2 connected in parallel to the pump passage 1, and actuator ports 3 and 4 connected to a hydraulic actuator (not illustrated), such as a boom cylinder, are formed, and a spool 7 installed in the valve body 5 and shifted to make the supply passage 2 and the actuator ports 3 and 4 communicate with each other so as to supply the hydraulic fluid from the hydraulic pump to the hydraulic actuator through the one actuator port 3 and to return the hydraulic fluid discharged from the hydraulic actuator to a tank passage 6 through the other actuator port 4, which includes a flow control spool 11 elastically installed in the spool 7 by a valve spring 21 and shifted in the spool 7 to fix a cross-sectional area of a passage that is connected to the one actuator port 3 to a set value if pressure of the hydraulic fluid that flows through the supply passage 2 is higher than a set pressure; a first passage 12 formed on the spool 7 to communicate with the supply passage 2; a second passage 13 formed on the spool 7 to communication with the one actuator port 3 and having a cross-sectional area that is varied depending on the shifting of the flow control spool 11; a first flow control passage 14 formed on the flow control spool 11 to communicate with the first passage 12; a second flow control passage 15 formed on the flow control spool 11 to communicate with the second passage 13; a third passage 16 formed on the flow control spool 11 to communicate with the first and second flow control passages 14 and 15; and a signal pressure passage 27 formed on the spool 7 to make the supply passage 2 and a pressure chamber 17 communicate with each other so that signal pressure can be supplied to the pressure chamber 17 to shift the flow control spool 11.

In this case, since the configuration according to this embodiment, except for the signal pressure passage 27 formed on the spool 7 to make the supply passage 2 and the pressure chamber 17 communicate with each other so that the signal pressure for shifting the flow control spool 11 can be supplied to the pressure chamber 17, and the pressure chamber 17 formed on the spool 7, is the same as the configuration of the flow control valve according to the third embodiment of the present invention, the detailed description of the configuration and the operation thereof will be omitted, and the same reference numerals are used for the duplicate components.

Hereinafter, the operation of the flow control valve for a construction machine according to the fourth embodiment of the present invention will be described in detail with reference to the accompanying drawings.

As shown in FIGS. 5 and 7, the hydraulic fluid that passes through the supply passage 2 due to the switching of the spool 7 passes through the first passage 12 of the spool 7 and the first flow control passage 14 of the flow control spool 11 in order and then flows into the third passage 16 of the flow control spool 11. At the same time, the hydraulic fluid of the supply passage 2 flows into the pressure chamber 17 through the signal pressure passage 27 formed on the spool 7.

At this time, if the flow rate of the hydraulic fluid that flows from the supply passage 2 to the third passage 16 of the flow control spool 11 exceeds the set flow rate, the pressure in the third passage 16 is increased. On the other hand, the hydraulic fluid that flows from the supply passage 2 to the pressure chamber 17 through the signal pressure passage 27 is used as signal pressure for shifting the flow control spool 11.

Accordingly, if the pressure of the pressure chamber 17 is relatively higher than the pressure that is obtained by summing the elastic force of the valve spring 21 and the pressure of the back pressure chamber 19, the flow control spool 11 is shifted in the right direction in the drawing (at this time, a part of the hydraulic fluid of the back pressure chamber 19 moves to the one actuator port 3 through a through-hole 30). That is, since the second passage 13 is clogged due to the shifting of the flow control spool 11, the flow passage between the third passage 16 and the one actuator port 3 is intercepted. Accordingly, the hydraulic fluid in the third passage 16 is supplied to the one actuator port 3 through the hydraulic fluid flow passage 26 formed on the spool 7.

If the pressure of the hydraulic fluid in the third passage 16 is lowered below the set value, the pressure that is obtained by summing the elastic restoring force of the valve spring 21 and the pressure of the back pressure chamber 19 becomes relatively higher than the pressure of the pressure chamber 17. Through this, the flow control spool 11 is shifted in the left direction in the drawing.

Accordingly, the flow passages between the third passage 16 of the flow control spool 11, the second flow control passage 15, and the one actuator port 3 communicate with each other, and thus the hydraulic fluid that flows into the third passage 16 is supplied to the one actuator port 3 through the second flow control path 15 at the set flow rate.

According to the flow control valve according to the fourth embodiment of the present invention as described above, if the pressure of the hydraulic fluid, which flows to the third passage 16 through the supply passage 2, exceeds the set value, the second passage 13 is intercepted due to the shifting of the flow control spool 11 provided in the spool 7. Through this, the hydraulic fluid of the third passage 16 is supplied to the one actuator port 3 through the hydraulic fluid flow passage 26 having a constant cross-sectional area.

Through this, the hydraulic fluid can be supplied from the supply passage 2 to the one actuator port 3 at a constant flow rate regardless of the pressure of the hydraulic pump and the hydraulic actuator and the supplied flow rate of the hydraulic pump.

INDUSTRIAL APPLICABILITY

As apparent from the above description, according to the present invention having the above-described configuration, since the flow rate of the hydraulic fluid supplied from the pump passage to the hydraulic actuator is constantly controlled through the shifting of the spool, a separate space for installing the flow control valve is unnecessary, and thus the manufacturing cost of the control valve can be reduced.

Further, since the flow rate of the hydraulic fluid, which is supplied to the hydraulic actuator through the spool, can be constantly controlled regardless of the pressure generated in the hydraulic pump and the hydraulic actuator and the change of the supplied flow rate of the hydraulic pump, the equipment has reliability.

The invention claimed is:

1. A flow control valve for a construction machine, including a valve body in which a supply passage communicating with a pump passage through which hydraulic fluid from a hydraulic pump is supplied and actuator ports connected to a hydraulic actuator are formed, and a spool installed in the valve body and shifted to make the supply passage communicate with the actuator ports so as to supply the hydraulic fluid from the hydraulic pump to the hydraulic actuator through a first actuator port of the actuator ports and to return the hydraulic fluid discharged from the hydraulic actuator to a tank passage through a second actuator port of the actuator ports, the flow control valve comprising:
   a flow control spool shifted in the spool to variably control the hydraulic fluid that flows to the first actuator port if a flow rate of the hydraulic fluid that flows through the supply passage is higher than a set flow rate;
   a first passage formed on the spool to communicate with the supply passage;
   a second passage formed on the spool to communicate with the first actuator port and having a cross-sectional area that is varied depending on the shifting of the flow control spool;
   a first flow control passage formed on the flow control spool to communicate with the first passage;
   a second flow control passage formed on the flow control spool to communicate with the second passage;
   a third passage formed on the flow control spool to communicate with the first and second flow control passages;
   a first signal pressure passage formed on the flow control spool to make the first flow control passage and a pressure chamber communicate with each other; and
   a second signal pressure passage formed on the flow control spool to make the third passage and a back pressure chamber communicate with each other.

2. A flow control valve for a construction machine, including a valve body in which a supply passage communicating with a pump passage through which hydraulic fluid from a hydraulic pump is supplied and actuator ports connected to a hydraulic actuator are formed, and a spool installed in the valve body and shifted to make the supply passage communicate with the actuator ports so as to supply the hydraulic fluid from the hydraulic pump to the hydraulic actuator through a first actuator port of the actuator ports and to return the hydraulic fluid discharged from the hydraulic actuator to a tank passage through a second actuator port of the actuator ports, the flow control valve comprising:
   a flow control spool shifted in the spool to variably control the hydraulic fluid that flows to the first actuator port if a flow rate of the hydraulic fluid that flows through the supply passage is higher than a set flow rate;
   a first passage formed on the spool to communicate with the supply passage;
   a second passage formed on the spool to communicate with the first actuator port and having a cross-sectional area that is varied depending on the shifting of the flow control spool;
   a first flow control passage formed on the flow control spool to communicate with the first passage;
   a second flow control passage formed on the flow control spool to communicate with the second passage;
   a third passage formed on the flow control spool to communicate with the first and second flow control passages;
   a second signal pressure passage formed on the flow control spool to make the third passage and a back pressure chamber communicate with each other; and
   a third signal pressure passage formed on the spool to make the supply passage and a pressure chamber communicate with each other so that signal pressure can be supplied to the pressure chamber to shift the flow control spool.

3. A flow control valve for a construction machine, including a valve body in which a supply passage communicating with a pump passage through which hydraulic fluid from a hydraulic pump is supplied and actuator ports connected to a hydraulic actuator are formed, and a spool installed in the valve body and shifted to make the supply passage communicate with the actuator ports so as to supply the hydraulic fluid from the hydraulic pump to the hydraulic actuator through a first actuator port of the actuator ports and to return the hydraulic fluid discharged from the hydraulic actuator to a tank passage through a second actuator port of the actuator ports, the flow control valve comprising:
   a flow control spool shifted in the spool to fix a flow rate of the hydraulic fluid that flows to the first actuator port to a set value if pressure of the hydraulic fluid that flows through the supply passage is higher than a set pressure;
   a first passage formed on the spool to communicate with the supply passage;
   a second passage formed on the spool to communicate with the first actuator port and having a cross-sectional area that is varied depending on the shifting of the flow control spool;
   a first flow control passage formed on the flow control spool to communicate with the first passage;

a second flow control passage formed on the flow control spool to communicate with the second passage;

a third passage formed on the flow control spool to communicate with the first and second flow control passages; and a hydraulic fluid flow passage formed on the spool to supply the hydraulic fluid that flows through the supply passage to the first actuator port if the pressure of the hydraulic fluid that flows into the third passage is increased and the second passage is clogged due to the shifting of the flow control spool.

4. A flow control valve for a construction machine, including a valve body in which a supply passage communicating with a pump passage through which hydraulic fluid from a hydraulic pump is supplied and actuator ports connected to a hydraulic actuator are formed, and a spool installed in the valve body and shifted to make the supply passage communicate with the actuator ports so as to supply the hydraulic fluid from the hydraulic pump to the hydraulic actuator through a first actuator port of the actuator ports and to return the hydraulic fluid discharged from the hydraulic actuator to a tank passage through a second actuator port of the actuator ports, the flow control valve comprising:

a flow control spool shifted in the spool to fix a flow rate of the hydraulic fluid that flows to the first actuator port to a set value if pressure of the hydraulic fluid that flows through the supply passage is higher than a set pressure;

a first passage formed on the spool to communicate with the supply passage;

a second passage formed on the spool to communicate with the first actuator port and having a cross-sectional area that is varied depending on the shifting of the flow control spool;

a first flow control passage formed on the flow control spool to communicate with the first passage;

a second flow control passage formed on the flow control spool to communicate with the second passage;

a third passage formed on the flow control spool to communicate with the first and second flow control passages; and a signal pressure passage formed on the spool to make the supply passage and a pressure chamber communicate with each other so that signal pressure can be supplied to the pressure chamber to shift the flow control spool; and a hydraulic fluid flow passage formed on the spool to supply the hydraulic fluid that flows through the supply passage to the first actuator port if the pressure of the hydraulic fluid that flows into the third passage is increased and the second passage is clogged due to the shifting of the flow control spool.

* * * * *